April 19, 1966   G. C. RUSSELL   3,246,435
BUILDING OF COMPOSITE PANELS WITH INTERFITTING POSTS AND
ROTATABLE CLAMP TYPE FASTENERS
Filed April 23, 1962   4 Sheets-Sheet 1
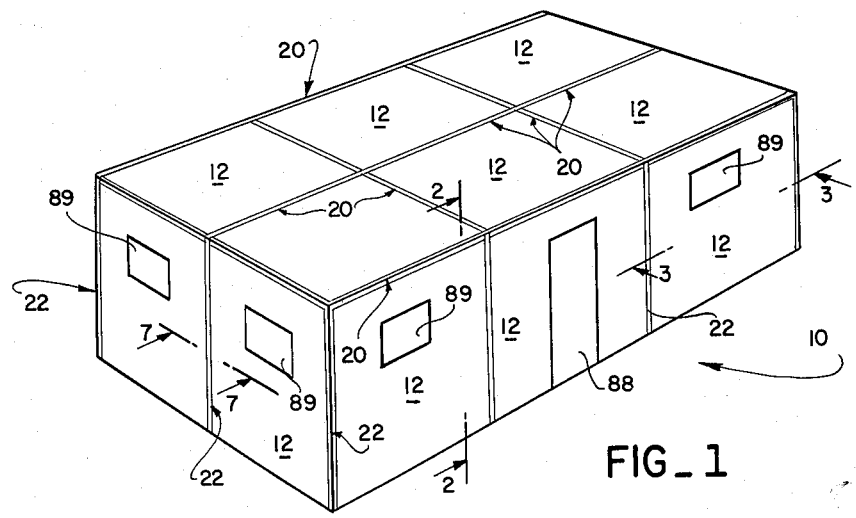
FIG_1
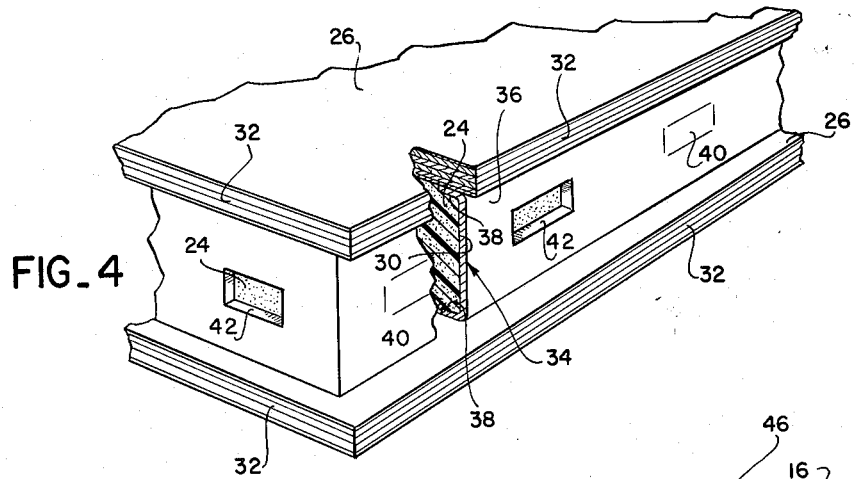
FIG_4
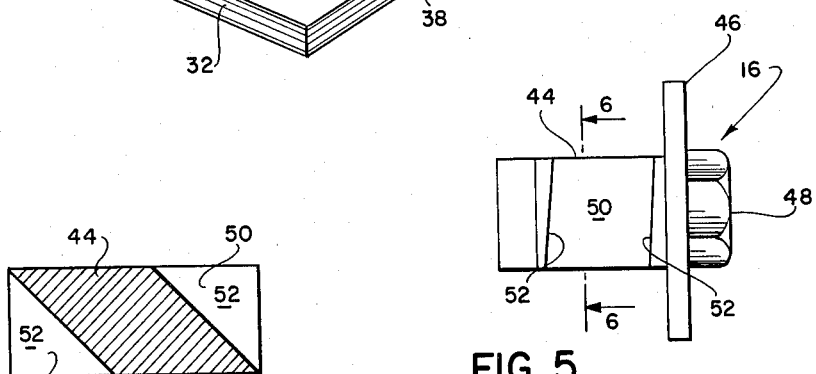
FIG_5
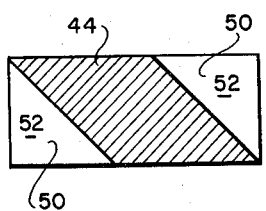
FIG_6
INVENTOR.
GORDON C. RUSSELL
BY
George Sullivan
Agent

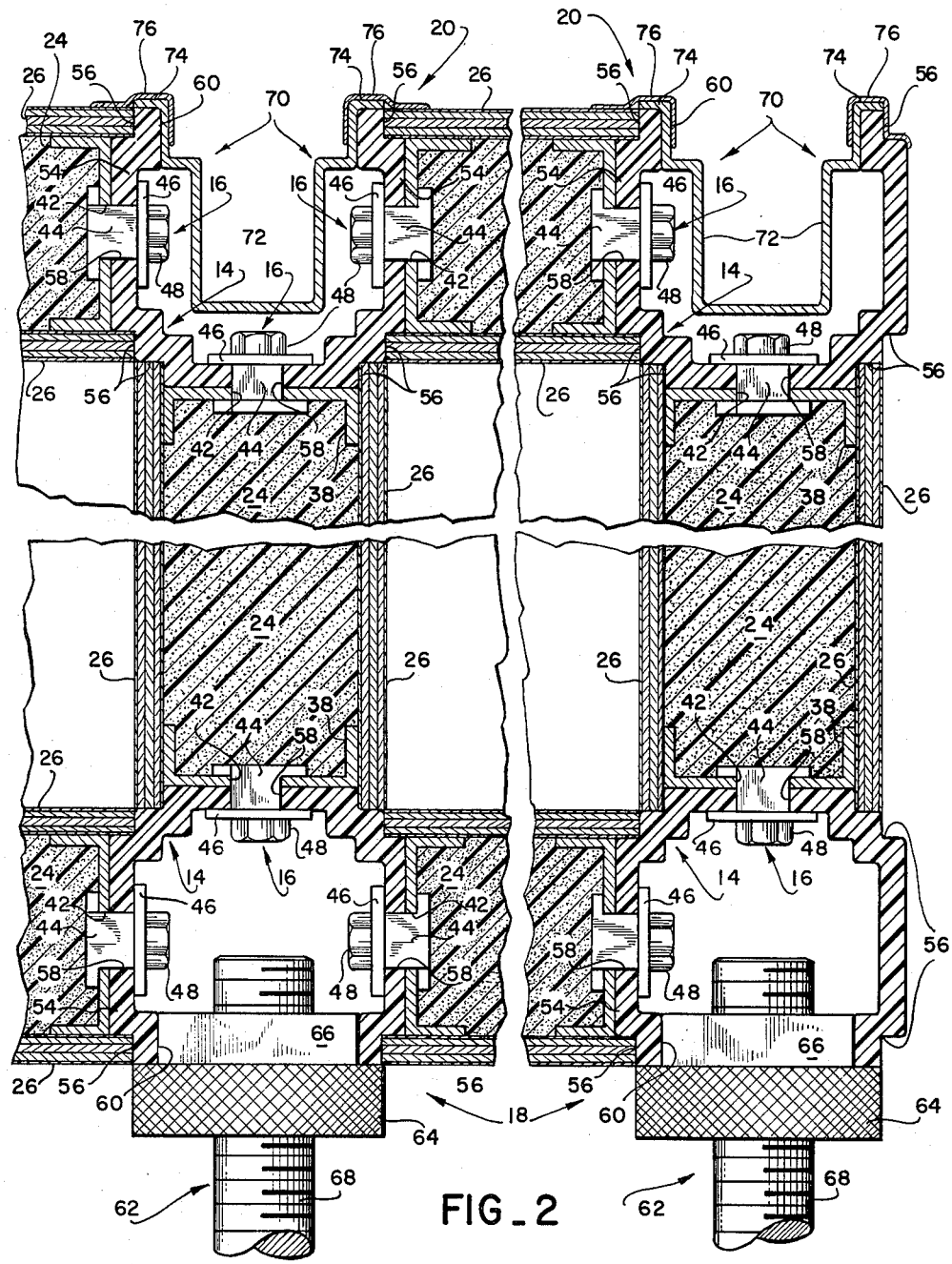
FIG_2
INVENTOR.
GORDON C. RUSSELL
BY George C. Sullivan
Agent

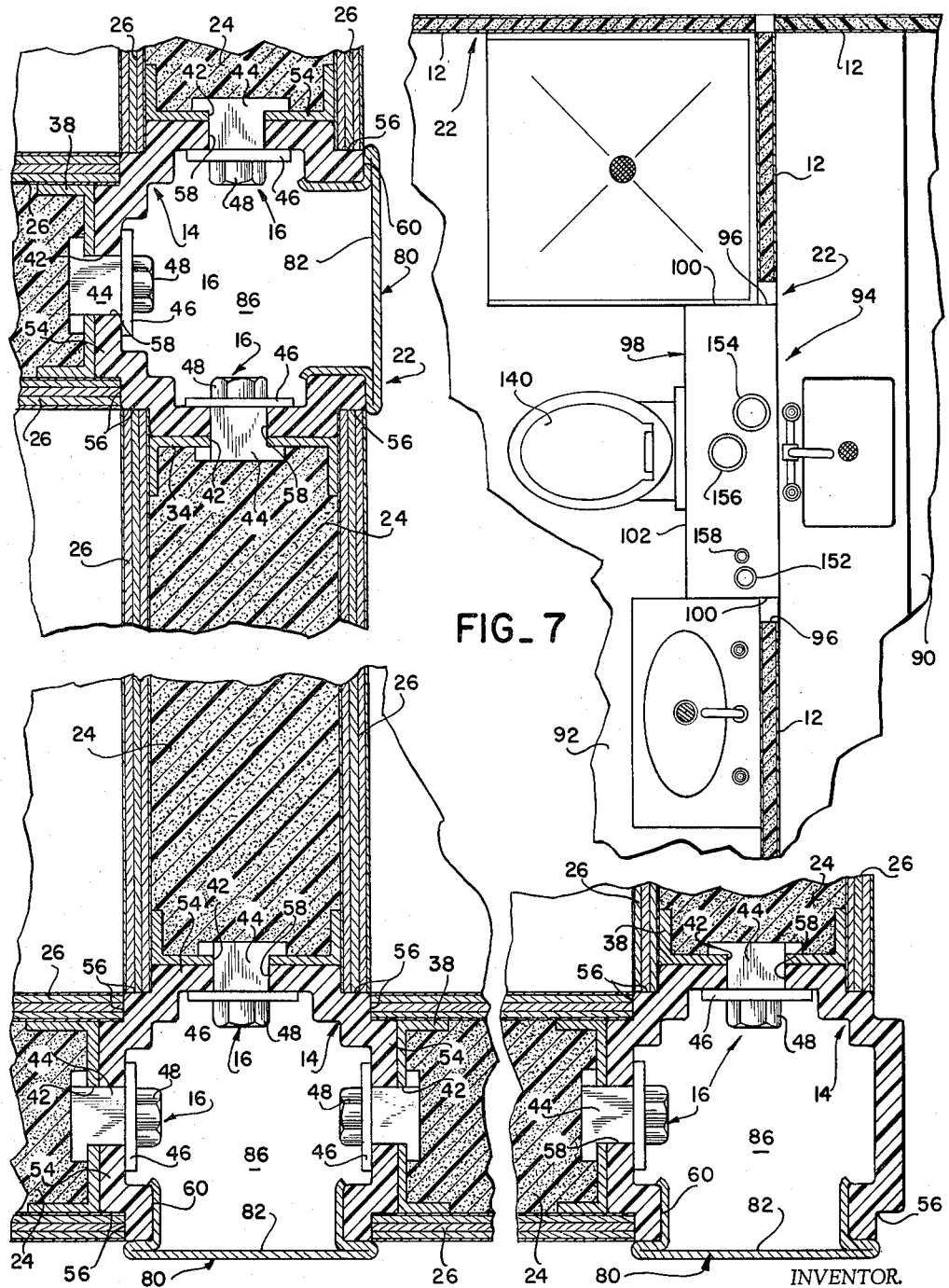

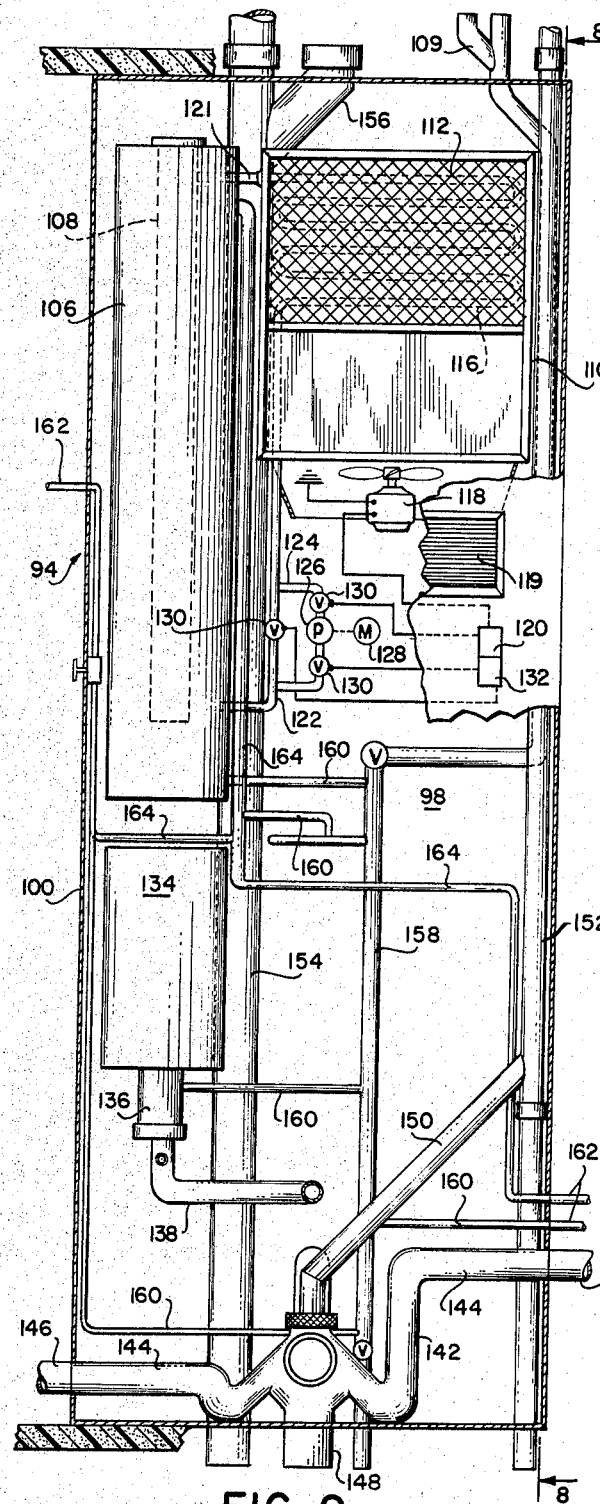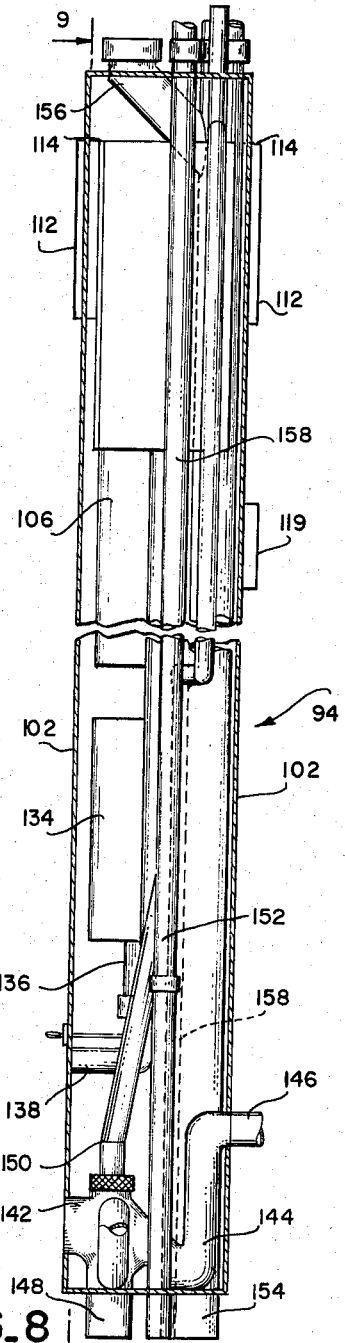

United States Patent Office
3,246,435
Patented Apr. 19, 1966

3,246,435
BUILDING OF COMPOSITE PANELS WITH INTERFITTING POSTS AND ROTATABLE CLAMP TYPE FASTENERS
Gordon C. Russell, Studio City, Calif., assignor to Lockheed Aircraft Corporation, Burbank, Calif.
Filed Apr. 23, 1962, Ser. No. 189,417
1 Claim. (Cl. 52—262)

This invention pertains to new and improved buildings and to core units containing basic plumbing and heating fixtures and appliances for use in these buildings.

It is a matter of common knowledge that the building art is one of the oldest fields known to mankind, and that an extremely wide variety of different types of buildings have been constructed and utilized in the past. Because of economic considerations there is at the present time a very definite need for improvement in the manner in which buildings are constructed. More specifically there is a need for buildings which can be constructed by comparatively unskilled labor in a comparatively short period of time at a nominal cost so as to include basic plumbing and heating fixtures and appliances such as are required in virtually any building constructed in accordance with the standards of our civilization.

An object of the present invention is to provide buildings meeting this need. More specific objects of the present invention are to provide relatively inexpensive buildings which are capable of being erected by comparatively unskilled labor utilizing a minimum of time and tools, which are capable of giving adequate service when used in virtually any climatic condition or area, and which employ only a minimum number of different parts.

A related object of the present invention is to provide a core unit or assembly containing basic plumbing and heating fixtures and appliances for use in buildings as are broadly indicated in the preceding, but which can be employed in other structures. Another object of the present invention is to provide core assemblies or units of this type which may be easily and conveniently manufactured in accordance with present day production techniques, and which can be easily installed within a building by comparatively unskilled labor with a minimum of difficulty, which can be utilized in a wide variety of different manners, and which are capable of giving prolonged, satisfactory service wherever they are employed.

These and various other objects of this invention as well as many specific advantages of it will be more fully apparent from a detailed consideration of the remainder of this specification including the appended claims and the accompanying drawings in which:

FIGURE 1 is a perspective view of a building constructed in acordance with this invention;

FIGURE 2 is a partial cross-sectional view taken at line 2—2 of FIGURE 1 showing various joint constructions employed in this building;

FIGURE 3 is a cross-sectional view taken at line 3—3 of FIGURE 1 showing various other joint constructions employed in this building;

FIGURE 4 is a partial perspective view showing the corner of a panel employed in the building indicated in the preceding figures;

FIGURE 5 is a side elevational view of a holding device employed in this building;

FIGURE 6 is a cross-sectional view taken at line 6—6 of FIGURE 5;

FIGURE 7 is a cross-sectional view taken at line 7—7 of FIGURE 1 showing the utilization of a core unit of this invention in the building illustrated;

FIGURE 8 is a partial cross-sectional view taken at line 8—8 of FIGURE 9; and

FIGURE 9 is a partial cross-sectional view taken at line 9—9 of FIGURE 8.

It is to be understood that the accompanying drawings are primarily intended so as to clearly show the construction of a presently preferred embodiment or form of a building and of a core plumbing and heating unit in accordance with the teachings of this invention. From a careful consideration of the remainder of this specification and of the accompanying drawings it will be realized that the basic teachings of this invention as embodied within the structure shown can be utilized in a virtually unlimited number of different manners through the use or exercise of routine design or engineering skill in order to provide buildings of many different sizes and shapes for virtually an unlimited number of different applications or uses. It will also be realized that core plumbing and heating units, as indicated in the accompanying drawings and in this specification, may also be modified in accordance with routine engineering skill without departing from the principles of the invention as set forth herein and as defined by appended claim forming a part of this disclosure.

As an aid to understanding this invention, it can be stated in essentially summary form that it concerns buildings, each of which includes a plurality of separate panels disposed with respect to one another so as to define various exterior, interior, floor and ceiling walls of a building, and joint means connecting the edges of these panels so as to provide a unitary structure. This invention also includes plumbing and heating core units or assemblies for use in such buildings or in other structures, each of which includes a housing within which there is located a hot water tank, means for heating the water within the tank, means for heating the interior of a building, trap and drain manifold means for use in connection with a plurality of plumbing fixtures within a building, and vent means for venting this trap and drain manifold means and various water supply and connecting lines for utilization in supplying water to various fixtures which may be drained using the trap and drain manifold means.

The actual nature of this invention is best more fully described by referring to the accompanying drawings. Here there is shown a building 10 in accordance with the present invention formed utilizing a plurality of identically constructed panels 12 which are connected together through the utilization of a plurality of identically constructed posts 14 and a plurality of identically constructed fasteners or holding devices 16. These holding devices 16 are intended to be utilized in securing panels 12 to posts 14 so as to create horizontally extending floor joints 18 and roof joints 20 and vertically extending interior and exterior wall joints 22 in this building 10.

The panels 12 employed in the building 10 are preferably constructed as indicated in FIGURES 2, 3 and 4 of the drawings so as to each include a core 24 of a rigid, cellular material capable of serving as satisfactory insulation under a wide variety of different climatic conditions located between two rigid sides or side walls 26. The cores 24 in the panels 12 may be conveniently formed of various known expanded or cellular polyurethane or polystyrene or similar plastic materials. The sides 26 may be constructed of a rigid synthetic or naturally occurring material. Thus, for example, the sides 26 in a panel 12 can be formed of a rigid polyurethane, phenolic or similar material or they may be formed of common plywood, so-called pressed hardboard created from wood or vegetable fibers or the like. If the materials of the latter category are used, preferably the exposed wall surfaces of the sides 26 in a panel 12 are covered by means of an adherent weather resistant coating of a paint or of a preformed resin film such as a phenol formaldehyde or melamine resin laminated to these sides 26 in accordance with conventional practice.

In each of the panels 12 the core 24 is secured to the sides 26 by the use of a conventional adhesive (not shown) so that the ends 30 of the core 24 are spaced internally from the ends 32 of the sides 26, and so that all of these ends 32 are parallel to one another. Further, in each of the panels 12 a rigid metal or plastic channel 34 having a base 36 and attached side walls 38 is disposed around each of the ends 30 of the core 24 so that the side walls 38 are held in place between the core 24 and the sides 26. Any convenient fastening means such as a conventional adhesive (not shown) may be used to hold these channels 34 in place. Preferably each of the channels 34 is formed so as to include a plurality of spaced, scored, non-round, rectilinear areas 40 each of which is capable of being removed by the use of a tool such as a screwdriver so as to provide a rectilinear opening 42.

The holding devices 16 employed include non-round, rectilinear shanks 44 capable of fitting through these openings 42 and include enlarged flanges 46 at an end of each of these shanks 44 and nut-like heads 48 located on the sides of each of these flanges 46 remote from the corresponding shanks 44. These shanks 44 are also provided with elongated slots 50 located at diametrically opposite corners of them next to the flanges 46. Preferably these slots 50 include sloping side walls 52 which make these slots of smaller dimension at their bases than at their entrances.

Each of the posts 14 utilized in the building 10 has essentially a U-shape and includes three walls 54 which are located at right angles with respect to one another in a square pattern. These walls 54 terminate in edge grooves 56 of such a dimension that each of the walls 54 is capable of being fitted between the ends 32 of the sides 26 of a panel 12 in order to rest against the end 30 of the core 24 in such a panel. Preferably these posts 14 include a plurality of spaced openings 58 having a size which permits insertion and rotation of the shank 44 of the holding device 16. Although the posts 14 may be formed of a variety of different rigid materials it is presently preferred to form them from a rigid material such as extruded aluminum, a rigid polyurethane, phenolic or other related compositions. It will be noted that each of the posts 14 as so formed includes an entrance opening 60 into its interior.

These entrance openings 60 are designed so as to permit a building such as the building 10 to be constructed by fitting the various panels 12 with respect to posts 14 as shown, inserting the holding devices 16 through the openings 42 and 58, and then by twisting these holding devices 16 as through the use of a conventional wrench (not shown) so that the slots 50 engage portions of the walls 54 of the posts 14 and of the bases 36 of the channels 34 in order to hold the panels 12 with respect to the posts 14. The sloping side walls 52 are designed so that a wedging action is achieved during the twisting of the holding devices 16. In this manner, this action firmly locks the panels 12 and the posts 14 to one another.

Utilizing this method of construction all of the floor, roof and wall joints 18, 20 and 22, respectively within the building 10 may be easily created in a comparatively short period. If desired, the various floor joints 18 may be supported upon jacks 62 of any of a variety of different types serving as a foundation for the building 10. The particular jacks 62 indicated include externally knurled cylinders 64 provided with end bosses 66 adapted to fit closely within the entrance openings 60. With this construction the walls 54 of the posts 14 extend around the end bosses 66 and fit against the cylinders 64. In the jacks 62 threaded shafts 68 are threaded through the interiors of the cylinders 64; this permits elevation adjustment by turning the cylinders 64.

Within the building 10 the roof joints 20 are preferably formed so that the openings 60 into the posts 14 are directed upward in order that extruded gutters 70 formed of a plastic such as polystyrene or a metal such as aluminum may be inserted through these openings 60. Each of these gutters 70 is of a U-shape and includes at the ends of its side walls 72 outwardly directed flanges 74 which are adapted to overlie and fit tightly against the ends of walls 54 in the channels 14 These gutters 70 may be secured in place through the use of an adhesive-coated, flexible, waterproof tape 76 as indicated in FIGURE 2 of the drawings.

Although it is not necessary it is preferred in the building 10 to enclose each of the wall joints 22 by means of a resilient, plastic or metal, elongated, chip-like closure plate 80. Each of the closure plates 80 preferably includes a central wall 82 adapted to extend across an entrance opening 60 and resilient terminal walls 84 attached to the edges of each wall 82. These terminal walls 84 preferably are of a shape adapted to extend around the interiors of the walls 54 of the openings 60 into the posts 14 so that they may be "snapped" in place.

When the closure plates 80 and the posts 14 are formed of metal they in effect define a completely enclosed passageway 86 which is capable of being used with electrical cables in accordance with various building and safety requirements. It is noted that the flanges 46 on the holding devices 16 are of such dimension as to close off the openings 58 from the passageways 86.

Various doors and windows 88 and 89 necessary in order to complete the building 10 may be located in panels 12 in accordance with conventional or known practice as the building 10 is being constructed, or may be located in these panels 12 as they are manufactured.

From a careful consideration of the foregoing it will be realized that when the building 10 is constructed as shown that various panels 12 within this building extend in three different planes, and that these panels are locked by the joints 18, 20 and 22 in these planes so that they tend to reinforce one another so that the building cannot bend or tilt. It will also be realized that each of the joints 18, 20 and 22 employed in this building is of a load-bearing character, and that in the construction shown various conventional structural elements used for strength purposes are not required. From a careful consideration of the building 10 it will be also apparent that the particular joints 18, 20 and 22 herein shown can be replaced by other differently constructed joints serving to join panels such as the panels 12 to one another in order to achieve the type of construction embodied within this building 10. Suitable other joint constructions are shown in the copending application Serial No. 185,334, filed April 5, 1962, entitled Joint Construction.

From a consideration of FIGURE 7 of the drawings it will be realized that the panels 12 can be used to subdivide the interior of the building 10 in order to provide within this building rooms 90 and 92 capable of being used as a kitchen and a bathroom, respectively. Between these rooms 90 and 92 a plumbing and heating core 94 is preferably utilized in a space 96 between two of the panels 12 so as to in effect serve as a part of an interior wall separating the rooms 90 and 92. The core 94 includes a housing 98 of a rectilinear configuration having ends 100 and sides 102 which extend vertically. These ends 100 may be secured to the abutting panels 12 in any convenient manner, as, for example, through the use of joints 22 previously described. Other equivalent means may be employed for this purpose.

Within the interior of this housing 98 there is located a hot water supply tank 106 containing an internal electric heating element 108 which extends along the center of this tank 106. The housing 98 also contains a boxlike heat exchanger 110 having an open bottom and having grills 112 formed in its sides which extend along openings 114 in the sides 102 of the housing 98. Within the interior of the heat exchanger 110 a metal pipe coil 116 is disposed adjacent to the grills 112 so that during the operation of this heat exchanger 110 a common electric fan 118 will serve so as to pull air through a grill 199 and to blow this air past the coil 116 through the grills 112 into either of the rooms 90 or 92. A conventional switch 120 on a side 102 of the housing 98 can be employed to control the operation of the fan 118. If desired, the fan 118 and the grill 119 may be omitted from the core 94, and in this case reliance will be placed upon convection currents serving to heat the rooms 90 and 92. An upper end of the coil 116 is connected to the upper end of the tank 106 by means of a connecting pipe 121, and a further connecting pipe 122 is employed in order to connect the lower end of the coil 116 to the lower end of the tank 106.

With this construction, normal convection currents will cause sufficient hot water for most normal heating purposes to circulate from the tank 106 through the coil 116. However, if desired, a small bypass loop 124 containing a conventional pump 126 powered by a motor 128 can be located along the length of the connecting pipe 122 for the purpose of circulating water through a coil 116. Appropriate valves 130 of a solenoid controlled variety are, of course, disposed within the pipe 122 and the connecting loop 124. When this connecting loop is utilized these valves 130 and the motor 128 can be controlled through the use of switches 132 mounted on a side 102 of the housing 98.

Within the housing 98 there is also located a flush tank 134 which is connected to a flush valve 136 which in turn is connected to another pipe 138 leading to the exterior of the housing 98. This flush tank 134, the flush valve 136 and the pipe 138 are all constructed as indicated in the co-pending application Serial No. 184,346, filed April 2, 1962, entitled Plumbing Fixtures, now Patent No. 3,141,472. These last three parts are employed in order to supply water to a conventional toilet bowl 140 mounted upon this housing 98 as described in this co-pending application so as to be connected to a trap and drain manifold 142 which is also constructed as shown in this same co-pending application. Drain pipes 144 lead from the trap and drain manifold 142 to the exterior of the housing 98 as described in this co-pending application in order to connect to the manifold 142 sink, wash basin, and shower drains 146. This manifold 142 is connected directly to a sewer line 148 and to a vent pipe 150 as described in this co-pending application.

Preferably the vent pipe 150 utilized is a lateral pipe extending as a branch off of another vent pipe 152 extending vertically through the housing 98. Also preferably within this housing there is disposed another vertical sewer pipe 154 which extends between the extremities of the housing 98 and which carries a conventional Y fitting 156 in such a manner that if desired this fitting 156 can be connected to another manifold 142 in another core 94 in the event several of the cores 94 are to be used on top of one another in a multistory building constructed in the same general manner as the building 10.

In the core 94 a cold water supply pipe 158 is used which leads into the interior of this core and various connecting pipes 160 lead from this cold water supply pipe 158 to the bottom of the hot water tank 106, to the flush valve 136 and then to the exterior of the housing 98 where these latter pipes are connected to appropriate water outlet pipes 162 at the exterior of the core 94 in accordance with conventional practice. Other connecting pipes 164 lead from the tank 106 to other water outlets 162 located on the exterior of the housing 98.

From a careful consideration of the core 94 it will be realized that this core can be referred to as a "core unit" or "assembly" inasmuch as it contains a number of different parts which are very closely related and which operate in combination with one another. This core 94 may easily be installed by comparatively unskilled labor in virtually any type of building even though it is specifically designed to be installed within buildings such as the building 10 and is most advantageously utilized within such buildings.

It will be realized from the foregoing that the core 94 is of such a character that it can be easily and conveniently manufactured at a comparatively nominal cost in a factory, and can be shipped at a comparatively nominal rate to wherever it is to be utilized because of its compact character. It will be further realized that a core 94 when installed satisfies various normal plumbing requirements based upon safety, ventilation and the like and that various plumbing fixtures such as toilet bowls, sinks, showers, basins and the like can be connected to this core with a minimum of difficulty by comparatively unskilled labor.

Because of the nature of this invention it is to be considered as being limited solely by the appended claim forming a part of this disclosure.

What is claimed is:

A building comprising:
  a plurality of individual panels each having peripheral edges with recesses therein and a rigid member secured to the panel within the recesses in the peripheral edges, the rigid member including side surfaces thereon;
  a panel oriented to serve as a floor;
  a plurality of the panels secured to the peripheral edges of the floor panel to serve as walls;
  a panel secured to the wall panels to serve as a ceiling;
  a post having side surfaces thereon and said post being positioned between each of adjacent panels and extending within the recesses of the peripheral edges of the panels and said post side surfaces abutting one of the rigid member side surfaces; and
  a plurality of fasteners rigidly securing the panel to the post to prevent relative movement between adjacent panels;
    the fasteners having enlarged rectangular flanges separated by a shank and including a wrench-receiving head at one end, the flanges of each fastener having opposed surfaces tapering toward one another,
    the post and each abutting rigid member having a rectangular opening of a size to permit insertion of one of the fastener rectangular flanges therethrough, the post opening and the rigid member opening being aligned with each other;
    the fastener shank extending through the aligned openings and the tapered surfaces respective of said one fastener flange and the fastener head side flange bearing respectively against the side surfaces of the rigid member and the post which are opposite the abutting side surfaces thereof.

References Cited by the Examiner

UNITED STATES PATENTS

| | | | |
|---|---|---|---|
| 1,111,131 | 9/1914 | Broughton | 52—270 |
| 1,945,474 | 1/1934 | Baldwin | 52—238 |

(Other references on following page)

UNITED STATES PATENTS

| | | | |
|---|---|---|---|
| 1,963,583 | 6/1934 | Jenkins | 52—520 |
| 2,037,895 | 4/1936 | Gugler | 52—173 |
| 2,168,725 | 8/1939 | Whelan | 52—220 |
| 2,244,649 | 6/1941 | Carpenter et al. | 52—210 |
| 2,318,966 | 5/1943 | Pillsbury et al. | 52—238 |
| 2,691,432 | 10/1954 | Klein et al. | 52—584 |
| 2,702,732 | 2/1955 | McCarran | 189—36 |
| 2,963,825 | 12/1960 | Douglas | 52—94 |
| 2,982,380 | 5/1961 | Rose | 52—578 |
| 3,035,669 | 5/1962 | Graff | 52—241 |

FOREIGN PATENTS

| | | |
|---|---|---|
| 530,754 | 12/1940 | Great Britain. |
| 603,435 | 6/1948 | Great Britain. |
| 626,216 | 7/1949 | Great Britain. |
| 536,806 | 12/1955 | Italy. |
| 277,579 | 12/1951 | Switzerland. |

RICHARD W. COOKE, JR., *Primary Examiner.*

JACOB L. NACHENOFF, HENRY C. SUTHERLAND, FRANK L. ABBOTT, *Examiners.*

A. C. PERHAM, *Assistant Examiner.*